United States Patent
Zeuch et al.

(10) Patent No.: US 10,297,134 B2
(45) Date of Patent: May 21, 2019

(54) ENERGY SUPPLY DEVICE

(71) Applicant: PHOENIX CONTACT GMBH & CO KG, Blomberg (DE)

(72) Inventors: Jochen Zeuch, Blomberg (DE); Hartmut Henkel, Blomberg (DE); Patrick Schweer, Hameln (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 0 days.

(21) Appl. No.: 15/307,454

(22) PCT Filed: Apr. 23, 2015

(86) PCT No.: PCT/EP2015/058778
§ 371 (c)(1),
(2) Date: Oct. 28, 2016

(87) PCT Pub. No.: WO2015/165791
PCT Pub. Date: Nov. 5, 2015

(65) Prior Publication Data
US 2017/0046939 A1    Feb. 16, 2017

(30) Foreign Application Priority Data
Apr. 28, 2014 (DE) .................. 10 2014 105 909

(51) Int. Cl.
*G08B 21/18* (2006.01)
*H02M 1/10* (2006.01)
(Continued)

(52) U.S. Cl.
CPC ............ *G08B 21/182* (2013.01); *H02J 13/00* (2013.01); *H02J 13/0003* (2013.01); *H02M 1/10* (2013.01);
(Continued)

(58) Field of Classification Search
CPC .... G08B 21/182; H02J 13/00; H02J 13/0003; H02J 3/14; H02M 1/10; H02M 1/36; B60L 11/1851
See application file for complete search history.

(56) References Cited

U.S. PATENT DOCUMENTS 5,847,950 A     12/1998   Bhagwat
9,270,239 B2 *  2/2016    Drogi ..................... H03F 3/189
(Continued)

FOREIGN PATENT DOCUMENTS

DE    102012203585 A1    9/2013
DE    102012207152 A1    10/2013

OTHER PUBLICATIONS

German Search Report for corresponding German Application No. 102014105909.3, dated Nov. 20, 2014.
(Continued)

*Primary Examiner* — Mohamed Barakat
(74) *Attorney, Agent, or Firm* — Workman Nydegger

(57) ABSTRACT

An energy supply device comprises an analysis unit for determining a signaling information which indicates a state of operation of the energy supply device, and a communication interface for outputting said signaling information. The analysis unit is designed to detect an operating variable of the energy supply device; to set a characterization parameter; and to characterize the detected operating variable of the energy supply device as a function of the characterization parameter in order to obtain the signaling information.

13 Claims, 3 Drawing Sheets

(51) Int. Cl.
*H02J 13/00* (2006.01)
*H02M 1/36* (2007.01)
*B60L 11/18* (2006.01)
*H02J 3/14* (2006.01)

(52) U.S. Cl.
CPC .............. *B60L 11/1851* (2013.01); *H02J 3/14* (2013.01); *H02M 1/36* (2013.01)

(56) References Cited

U.S. PATENT DOCUMENTS

| | | | |
|---|---|---|---|
| 2004/0036539 A1* | 2/2004 | Hammes | H03C 3/0925 331/16 |
| 2004/0093533 A1* | 5/2004 | Chapuis | H02J 1/08 714/22 |
| 2005/0134239 A1 | 6/2005 | Harris et al. | |
| 2008/0102754 A1* | 5/2008 | Heinemann | G05B 19/4183 455/41.2 |
| 2011/0012427 A1* | 1/2011 | Craig | H02J 3/14 307/29 |
| 2012/0019364 A1* | 1/2012 | Reichenbach | G06K 7/10079 340/10.1 |
| 2012/0266007 A1* | 10/2012 | Menon | G06F 1/26 713/340 |
| 2013/0066482 A1* | 3/2013 | Li | H02J 3/14 700/297 |
| 2013/0271285 A1* | 10/2013 | Sako | G08B 21/182 340/636.1 |
| 2014/0070919 A1* | 3/2014 | Jackson | G08C 17/02 340/5.61 |
| 2015/0132616 A1 | 5/2015 | Sahner et al. | |

OTHER PUBLICATIONS

International Search Report for corresponding International PCT Application No. PCT/EP20151058778, dated Jul. 17, 2015.

* cited by examiner

ENERGY SUPPLY DEVICE

BACKGROUND

The present invention relates to an energy supply device having a communication interface for signaling an operating state.

An energy supply device such as a universal voltage supply unit or a universal current supply unit frequently comprises a detection mechanism for detecting an operating variable such as an output voltage. The operating variable can be checked as to whether it exceeds or falls short of a predetermined threshold value in order to obtain signaling information able to be output via a signal output of the energy supply device. For example, the signaling information indicates whether the output voltage of the energy supply device exceeds or falls short of a predetermined amplitude threshold for the output voltage. In so doing, both the operating variable used in determining the signaling information as well as the predetermined threshold value are frequently predefined. This can be perceived as being inconvenient.

SUMMARY

The task on which the present invention is based is that of specifying an efficient concept for configurable signaling of an energy supply device operating state.

The subject matter solves this task by means of the features of the independent claims. Advantageous embodiments of the invention constitute the subject matter of the figures, the description and the dependent claims.

According to a first aspect of the invention, the task is solved by an energy supply device comprising: an evaluation unit for determining signaling information which indicates an operating state of the energy supply device; and a communication interface for outputting the signaling information; wherein the evaluation unit is designed to detect an operating variable of the energy supply device; set a characterizing parameter; and characterize the detected operating variable of the energy supply device as a function of the characterizing parameter in order to obtain the signaling information. This thereby achieves the advantage of being able to provide an energy supply device having configurable signaling of an operating state of said energy supply device.

The energy supply device can be an electrical energy supply device such as a universal voltage supply unit or a universal current supply unit. Furthermore, the operating variable can be an input voltage, an input current, an output voltage or an output current of the energy supply device.

The operating state can be a valid or invalid input voltage, valid or invalid input current, valid or invalid output voltage and/or a valid or invalid output current.

The characterizing parameter can comprise an amplitude threshold of an input voltage, an amplitude threshold of an input current, an amplitude threshold of an output voltage, an amplitude threshold of an output current or a frequency threshold of a frequency. Furthermore, the evaluation unit can select the characterizing parameter from a plurality of previously stored characterizing parameters in order to set said characterizing parameter. The signal information can be a single bit or a sequence of bits.

The evaluation unit can be a microcontroller or can comprise a microcontroller. The evaluation unit can furthermore comprise a processor, a logic module and/or a discrete analog circuit. The evaluation unit can further be designed to check the detected operating variable of the energy supply device as to whether it exceeds or falls short of a threshold value in order to characterize said detected operating variable. For example, the evaluation unit checks the output voltage of the energy supply device as to whether it exceeds a minimum output voltage for obtaining the signaling information. The signaling information can hereby encompass a Power Good or DCOK signal, which signals that the output voltage of the energy supply device exceeds the minimum output voltage or a minimum value. The evaluation unit can further be designed to invert the result of characterizing the detected operating variable of the energy supply device as a function of the characterizing parameter.

The evaluation unit can further be designed to detect a temperature such as an energy supply device housing temperature or an ambient temperature of the energy supply device. For example, upon the housing temperature of the energy supply device falling below a first temperature threshold, a load resistor can warm the housing of the energy supply device or warm up the energy supply device. To this end, a current can be passed through the load resistor, the current flow heating same. The first temperature threshold can be −60° C., −50° C.; −40° C., −30° C., −20° C., −10° C., 0° C. or 10° C. Furthermore, upon the housing temperature of the energy supply device exceeding a second temperature threshold, an output power of the energy supply device can be reduced or the energy supply device can be derated. The second temperature threshold can be 30° C., 40° C., 50° C., 60° C., 70° C., 80° C., 90° C., 100° C., 110° C., 120° C. or 130° C.

The evaluation unit can furthermore be designed to detect an operating period such as the hours the energy supply device has been operated. As an example, the energy supply device comprises an electrolytic capacitor having a limited life span. By means of the signaling information, a reaching of an early warning threshold or a time threshold, e.g. 70%, 80% or 90% of the electrolytic capacitor's life span, can be signaled through the operating time.

The communication interface can comprise a wired and/or wireless communication interface. For example, the communication interface comprises a serial interface, an interface pursuant to the Power Management Bus (PMBus) standard, an interface pursuant to the Universal Serial Bus (USB) standard, a wireless communication interface via Radio Frequency Identification (RFID), e.g. pursuant to the ISO/IEC 14443 or ISO/IEC 18000-3 standard, a wireless communication interface via Near Field Communication (NFC), e.g. pursuant to the ISO/IEC 14443 or ISO/IEC 18092 standard, or a wireless communication interface pursuant to one of the Bluetooth, ZigBee or Wireless Local Area Network (W-LAN) standards. Furthermore, the communication interface can comprise a signal output.

In one advantageous embodiment of the energy supply device, the evaluation unit is designed to select the characterizing parameter from a plurality of previously stored characterizing parameters in order to set the characterizing parameter. This thereby achieves the advantage of being able to efficiently set the characterizing parameter.

In a further advantageous embodiment of the energy supply device, the evaluation unit is designed to check the detected operating variable of the energy supply device as to whether it exceeds or falls short of a threshold value in order to characterize the detected operating variable of the energy supply device as a function of the characterizing parameter. This thereby achieves the advantage of being able to efficiently determine an operating state of the energy supply device.

In a further advantageous embodiment of the energy supply device, the characterizing parameter encompasses at least one of the following parameters: an amplitude threshold of an input voltage, an amplitude threshold of an input current, an amplitude threshold of an output voltage, an amplitude threshold of an output current, a frequency threshold of a frequency, a power threshold of an input power, a power threshold of an output power, a temperature threshold of a temperature, a time threshold of an operating period, a ripple threshold of an output voltage or a ripple threshold of an output current. This thereby achieves the advantage of being able to set an efficient characterizing parameter.

In a further advantageous embodiment of the energy supply device, the operating variable of the energy supply device is one of the following operating variables: an input voltage, an input current, an output voltage, an output current, a frequency, an input power, an output power, a temperature, an operating period, an output voltage ripple or an output current ripple. This thereby achieves the advantage of the operating state of the energy supply device being able to be signaled on the basis of an input variable or an output variable of the energy supply device.

In a further advantageous embodiment of the energy supply device, the evaluation unit is designed to detect a further operating variable of the energy supply device and characterize the detected operating variable of the energy supply device as well as the further detected operating variable of the energy supply device as a function of the characterizing parameter in order to obtain the signaling information. This thereby achieves the advantage of the operating state of the energy supply device being able to be signaled on the basis of a plurality of input variables and/or output variables of the energy supply device.

As an example, the detected operating variable is an output voltage and the further operating variable is a corresponding output current of the energy supply device.

In a further advantageous embodiment of the energy supply device, the evaluation unit is designed to link the detected operating variable of the energy supply device and the further detected operating variable of the energy supply device by a logical operation in order to obtain the signaling information. This thereby achieves the advantage of being able to efficiently determine the operating state.

The logical operation can comprise an AND operation (AND), an OR operation (OR), an exclusive OR operation (XOR), a not-AND operation (NAND), a not-OR operation (NOR) and/or a not-exclusive OR operation (XNOR). For example, the evaluation unit checks a respective output voltage and corresponding output current as to whether they exceed a respective threshold and links the results of the respective check by an AND operation in order to obtain the signaling information.

In a further advantageous embodiment of the energy supply device, the communication interface is designed to output a digital signal in order to display the operating state of the energy supply device. This thereby achieves the advantage of enabling the efficient further processing of the signaling information.

In a further advantageous embodiment of the energy supply device, the communication interface is designed to receive the characterizing parameter via a communications network. This thereby achieves the advantage of enabling efficient setting of the characterizing parameter.

The communications network can be a telephone network, a mobile network, a computer network, e.g. a Local Area Network (LAN) or a Wireless Local Area Network (W-LAN), or the internet.

In a further advantageous embodiment of the energy supply device, the energy supply device is designed with a memory for storing the received characterizing parameter, wherein the evaluation unit is designed to read out the characterizing parameter from the memory in order to set said characterizing parameter. This thereby achieves the advantage of enabling efficiently setting of the characterizing parameter.

The memory can comprise an electrically erasable programmable read-only memory, e.g. Electrically Erasable Programmable Read-Only Memory (EEPROM). Furthermore, the evaluation unit can be designed to read the parameterizing data from the memory upon the energy supply device being activated.

The energy supply device can further be designed to store a plurality of characterizing parameters in the memory, wherein the evaluation unit is designed to select the characterizing parameter from the plurality of stored characterizing parameters in order to set said characterizing parameter.

In a further advantageous embodiment of the energy supply device, the communication interface is designed to receive the characterizing parameter from a communication device via the communications network. This thereby achieves the advantage of being able to efficiently transmit the characterizing parameter to the energy supply device.

The communication device can be a computer, a smartphone or a hand-held device.

In a further advantageous embodiment of the energy supply device, the communication interface comprises a wireless communication interface. This thereby achieves the advantage of the energy supply device and the communication device being able to be galvanically isolated.

In a further advantageous embodiment of the energy supply device, the communication interface comprises a near field communication interface. This thereby achieves the advantage of enabling the use of an efficient communication interface to receive the characterizing parameter.

The near field communication interface can be designed to communicate via Near Field Communication (NFC), e.g. pursuant to the ISO/IEC 14443 or ISO/IEC 18092 standard.

In a further advantageous embodiment of the energy supply device, the communication interface can be wirelessly supplied with electrical energy. This thereby achieves the advantage of the characterizing parameter being able to be set when the power supply device is in a deactivated state.

In a further advantageous embodiment of the energy supply device, the communication interface comprises an antenna which is arranged within a housing of the energy supply device or integrated into a housing wall of an energy supply device housing. This thereby achieves the advantage of enabling a particularly compact design to the energy supply device.

The antenna can be formed by circuit paths on a circuit board or printed circuit board. The housing of the energy supply device can furthermore be a plastic housing or comprise a housing element through which electromagnetic signals can pass.

According to a second aspect of the invention, the task is solved by a method for determining signaling information which indicates an operating state of an energy supply device; the method comprising: detecting an operating variable of the energy supply device; setting a characterizing parameter; characterizing the detected operating variable as a function of the characterizing parameter so as to obtain the signaling information; and outputting the signaling information via a communication interface of the energy supply device. This thereby achieves the advantage of being able to efficiently set the signaling of the energy supply device's operating state.

In order to set the characterizing parameter, said characterizing parameter can be selected from a plurality of previously stored characterizing parameters.

In one advantageous embodiment of the method, the method further comprises: detecting a further operating variable of the energy supply device; and characterizing the detected operating variable of the energy supply device as well as the further detected operating variable of the energy supply device as a function of the characterizing parameter in order to obtain the signaling information. This thereby achieves the advantage of the operating state of the energy supply device being able to be signaled on the basis of a plurality of input variables and/or output variables.

The detected operating variable of the energy supply device and the further detected operating variable of the energy supply device can be linked by a logical operation in order to characterize the detected operating variable of the energy supply device as well as the further detected operating variable of the energy supply device as a function of the characterizing parameter. The logical operation can comprise an AND operation (AND), an OR operation (OR), an exclusive OR operation (XOR), a not-AND operation (NAND), a not-OR operation (NOR) and/or a not-exclusive OR operation (XNOR). For example, a respective output voltage and output current are in each case checked as to whether they exceed a respective threshold and the results of the respective check are then linked by an AND operation in order to obtain the signaling information.

In a further advantageous embodiment of the method, the method further comprises: receiving the characterizing parameter via a communications network. This thereby achieves the advantage of enabling efficient setting of the characterizing parameter.

The communications network can be a telephone network, a mobile network, a computer network, e.g. a Local Area Network (LAN) or a Wireless Local Area Network (W-LAN), or the internet.

BRIEF DESCRIPTION OF THE DRAWINGS

Embodiments of the invention are depicted in the drawings and will be described in greater detail below.
Shown are.

DETAILED DESCRIPTION OF VARIOUS EMBODIMENTS

Figure 1:
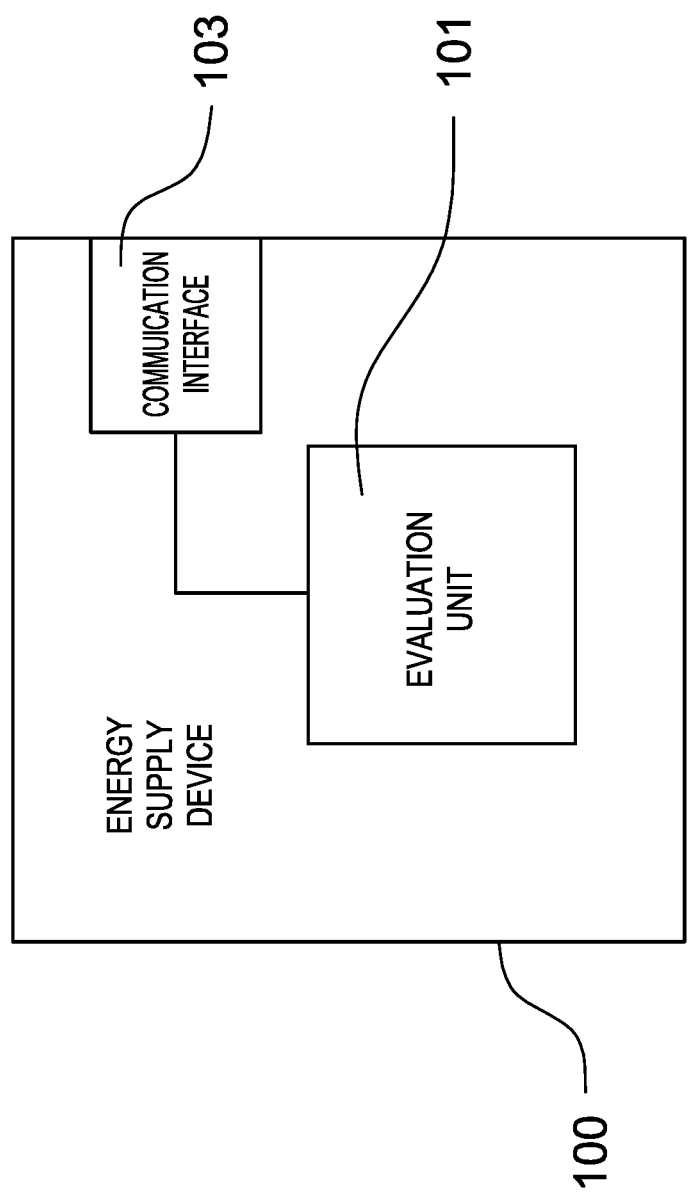
FIG. 1 a schematic diagram of an energy supply device according to one embodiment.

FIG. 1 shows a schematic diagram of an energy supply device 100 according to one embodiment. The energy supply device 100 comprises an evaluation unit 101 and a communication interface 103.

The energy supply device 100 is configured with: the evaluation unit 101 for determining signaling information which indicates an operating state of the energy supply device 100; and the communication interface 103 for outputting the signaling information; wherein the evaluation unit 101 is designed to detect an operating variable of the energy supply device 100; set a characterizing parameter; and characterize the detected operating variable of the energy supply device 100 as a function of the characterizing parameter in order to obtain the signaling information.

The energy supply device 100 can be an electrical energy supply device such as a universal voltage supply unit or a universal current supply unit. Furthermore, the operating variable can be an input voltage, an input current, an output voltage or an output current of the energy supply device 100.

The operating state can be a valid or invalid input voltage, a valid or invalid input current, a valid or invalid output voltage and/or a valid or invalid output current.

The characterizing parameter can comprise an amplitude threshold of an input voltage, an amplitude threshold of an input current, an amplitude threshold of an output voltage, an amplitude threshold of an output current or a frequency threshold of a frequency. Furthermore, the evaluation unit 101 can select the characterizing parameter from a plurality of previously stored characterizing parameters in order to set said characterizing parameter. The signal information can be a single bit or a sequence of bits.

The evaluation unit 101 can be a microcontroller or can comprise a microcontroller. The evaluation unit 101 can furthermore comprise a processor, a logic module and/or a discrete analog circuit. The evaluation unit 101 can further be designed to check the detected operating variable of the energy supply device 100 as to whether it exceeds or falls short of a threshold value in order to characterize said detected operating variable. For example, the evaluation unit 101 checks the output voltage of the energy supply device 100 as to whether it exceeds a minimum output voltage for obtaining the signaling information. The signaling information can hereby encompass a Power Good or DCOK signal, which signals that the output voltage of the energy supply device 100 exceeds the minimum output voltage or a minimum value. The evaluation unit 101 can further be designed to invert the result of characterizing the detected operating variable of the energy supply device 100 as a function of the characterizing parameter.

The evaluation unit 101 can furthermore be designed to detect a temperature such as a housing temperature of the energy supply device 100 or an ambient temperature of the energy supply device 100. For example, upon the housing temperature of the energy supply device 100 falling below a first temperature threshold, a load resistor can warm the housing of the energy supply device 100 or warm up the energy supply device 100. To this end, a current can be passed through the load resistor, the current flow heating same. The first temperature threshold can be −60° C., −50° C.; −40° C., −30° C., −20° C., −10° C., 0° C. or 10° C. Furthermore, upon the housing temperature of the energy supply device 100 exceeding a second temperature threshold, an output power of the energy supply device 100 can be reduced or the energy supply device 100 derated. The second temperature threshold can be 30° C., 40° C., 50° C., 60° C., 70° C., 80° C., 90° C., 100° C., 110° C., 120° C. or 130° C.

The evaluation unit 101 can furthermore be designed to detect an operating period such as the hours the energy supply device 100 has been operated. As an example, the energy supply device 100 comprises an electrolytic capacitor having a limited life span.

By means of the signaling information, a reaching of an early warning threshold or a time threshold, e.g. 70%, 80% or 90% of the electrolytic capacitor's life span, can be signaled through the operating time.

The communication interface 103 can comprise a wired and/or wireless communication interface. For example, the communication interface 103 comprises a serial interface, an interface pursuant to the Power Management Bus (PMBus) standard, an interface pursuant to the Universal Serial Bus (USB) standard, a wireless communication interface via Radio Frequency Identification (RFID), e.g. pursuant to the ISO/IEC 14443 or ISO/IEC 18000-3 standard, a wireless communication interface via Near Field Communication (NFC), e.g. pursuant to the ISO/IEC 14443 or ISO/IEC 18092 standard, or a wireless communication interface pursuant to one of the Bluetooth, ZigBee or Wireless Local Area Network (W-LAN) standards. Furthermore, the communication interface 103 can comprise a signal output.

According to one embodiment, the communication interface 103 or a plurality of signal outputs can be freely configurable. Furthermore, different operating variables and/or characterizing parameters can be freely configurable.

According to a further embodiment, the energy supply device 100 can detect a plurality of different operating variables by means of an evaluation unit 101 or in a microcontroller and then evaluate or characterize same. To evaluate or characterize the operating variables for signaling, the operating variables can be arbitrarily parameterized via the communication interface 103, an interface to the evaluation unit 101 or an interface to a microcontroller. The signals obtained from the evaluation or from the characterizing can be further processed at will and output as a digital signal, e.g. via the communication interface 103 or a signal output.

According to a further embodiment, the evaluation unit 101 or a microcontroller can detect different operating variables. To evaluate or to characterize for signaling, operating variables can be checked as to whether they exceed or fall below a respective threshold value. The operating variables and/or the respective thresholds can be freely parameterized via the communication interface 103, an interface of the evaluation unit 101 or an interface of the microcontroller. The signals obtained can be further processed at will.

For example, a signal of an operating variable is inverted or non-inverted and linked with a signal assigned to a further operating variable by a logical operation such as an AND operation (AND) or an OR operation (OR). The signaling information obtained can thereafter be output as a digital signal. Furthermore, one operating variable can also be utilized or linked multiple times. As an example, an operating variable, such as output current, is checked as to exceeding or falling short of a threshold and the result of the checking signaled by means of the signaling information.

Figure 2:
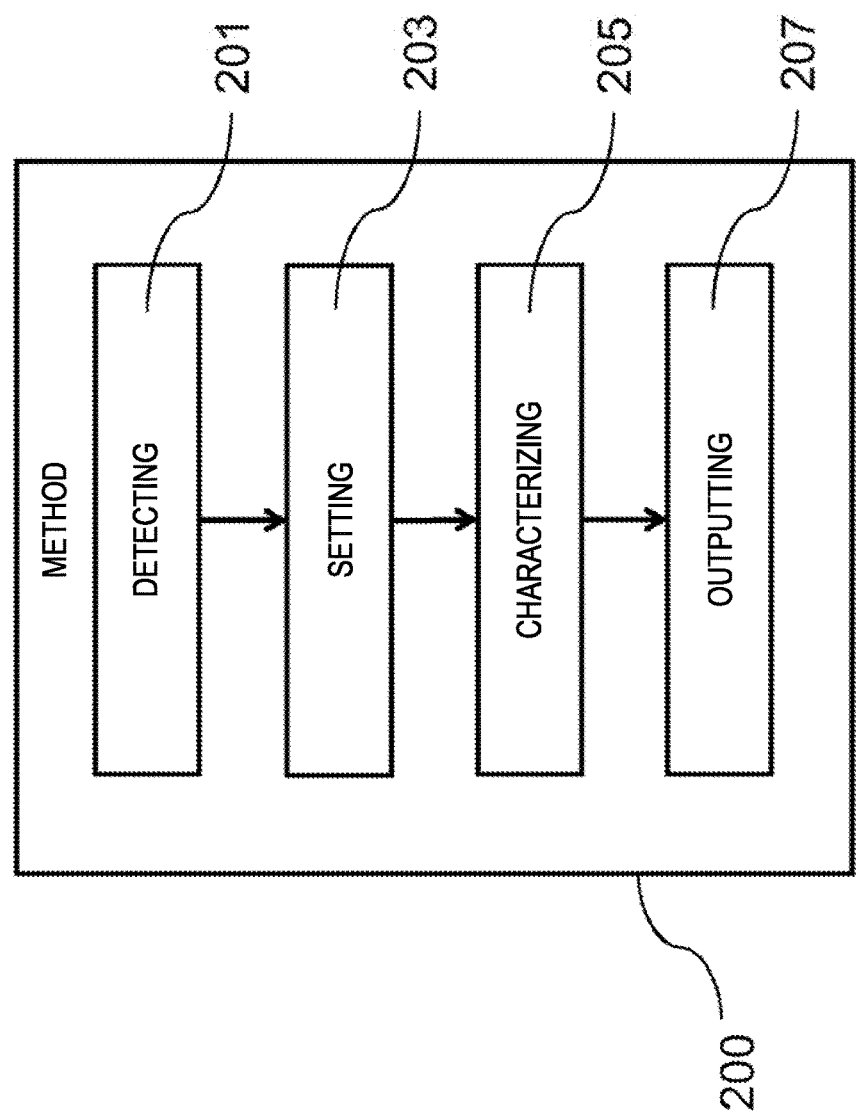
FIG. 2 a schematic diagram of a method according to one embodiment for determining signaling information which indicates an operating state of an energy supply device.

FIG. 2 shows a schematic diagram of a method 200 according to one embodiment for determining signaling information indicating an operating state of an energy supply device 100. The method 200 comprises the method steps of detecting 201, setting 203, characterizing 205 and outputting 207.

The method 203 for determining signaling information which indicates an operating state of an energy supply device 100 comprises: detecting 201 an operating variable of the energy supply device 100; setting 203 a characterizing parameter; characterizing 205 the detected operating variable as a function of the characterizing parameter so as to obtain the signaling information; and outputting 207 the signaling information via a communication interface 103 of the energy supply device 100.

In order to set 203 the characterizing parameter, said characterizing parameter can be selected from a plurality of previously stored characterizing parameters.

Figure 3:
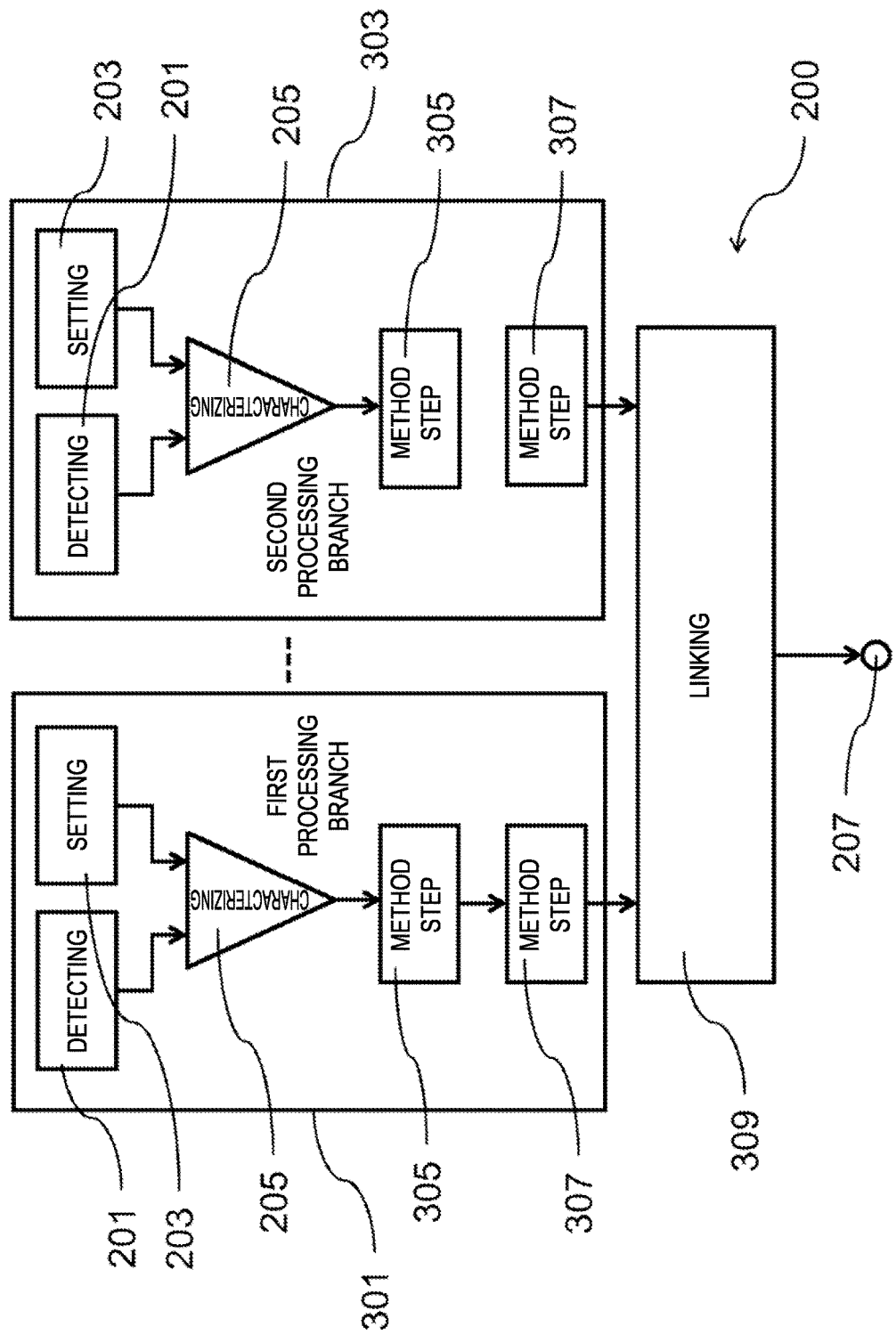
FIG. 3 a schematic diagram of a method according to a further embodiment for determining signaling information which indicates an operating state of an energy supply device.

FIG. 3 shows a schematic diagram of a method 200 according to a further embodiment for determining signaling information indicating an operating state of an energy supply device 100. The method comprises a first processing branch 301 for processing a first operating variable and a second processing branch 303 for processing a second operating variable. The method 200 can be expanded to any number of processing branches and operating variables. For better clarity, only two processing branches are illustrated. The method 200 furthermore comprises the steps of linking 309 and outputting 207 as well as method steps 305 and 307.

The first processing branch 301 comprises detecting 201 of the first operating variable, e.g. an output voltage or an "electric variable 1." Furthermore, a first threshold value such as an amplitude threshold for the output voltage or a "threshold level 1" is set during the setting 203 of the characterizing parameter. During the characterizing 205 of the detected first operating variable as a function of the characterizing parameter, the first operating variable can be checked as to whether it falls below or exceeds the set first threshold so as to obtain a result of the check. The check can be performed in a comparator. For example, the result of the check is 0 or 1. The result of the check can thereafter be further processed in methods steps 305 and 307. For example, the result is inverted or is not inverted in method step 305. Furthermore, the first processing branch 301 can be activated or deactivated in method step 307. A first instance of information can be generated over the course of the first processing branch 301.

The second processing branch 303 comprises detecting 201 of the second operating variable, e.g. an output current or an "electric variable n." Furthermore, a second threshold value such as an amplitude threshold for the output current or a "threshold level n" is set during the setting 203 of the characterizing parameter. During the characterizing 205 of the detected second operating variable as a function of the characterizing parameter, the second operating variable can be checked as to whether it falls below or exceeds the set second threshold so as to obtain a result of the check. The check can be performed in a comparator. For example, the result of the check is 0 or 1. The result of the check can thereafter be further processed in methods steps 305 and 307. For example, the result is inverted or is not inverted in method step 305. Furthermore, the second processing branch 303 can be activated or deactivated in method step 307. A second instance of information can be generated over the course of the second processing branch 303.

During the linking 209, the first information determined in the first processing branch 301 and the second information determined in the second processing branch can be linked by a logical operation in order to obtain the signaling information. The logical operation can comprise an AND operation (AND), an OR operation (OR), an exclusive OR operation (XOR), a not-AND operation (NAND), a not-OR operation (NOR) and/or a not-exclusive OR operation (XNOR).

When outputting 207 the signaling information, the signaling information or an "output 1" can be output via a communication interface 103 or a signal output of the energy supply device 100.

All of the features described and shown in connection with individual embodiments of the invention can be provided in different combinations in the inventive subject matter so as to realize their advantageous effects simultaneously.

The protective scope of the present invention is conferred by the claims and is not limited by the features defined in the description or illustrated in the figures.

LIST OF REFERENCE NUMERALS 100 energy supply device
101 evaluation unit
103 communication interface
200 method
201 detecting
203 setting
205 characterizing
207 outputting
300 first processing branch
303 second processing branch
305 method step
307 method step
309 linking

The invention claimed is:

1. An energy supply device, comprising:
an evaluation unit for determining signaling information which indicates an operating state of the energy supply device; and
a communication interface for outputting the signaling information to a communication device, wherein the evaluation unit is designed to:
detect an operating variable of the energy supply device;
set a characterizing parameter;
wherein the detected operating variable of the energy supply device as a function of the characterizing parameter in order to obtain the signaling information,
the communication interface is configured to be wirelessly supplied with electrical energy such that a characterizing parameter of the energy supply device may be set while the energy supply device is in a deactivated state and comprises a near field communication interface,
the communication interface including an antenna which is arranged within a housing of the energy supply device and integrated into a housing wall of a housing of the energy supply device, and
the communication device comprises a computer, smartphone or hand-held device.

2. The energy supply device according to claim 1, wherein the evaluation unit is designed to select the characterizing parameter from a plurality of previously stored characterizing parameters in order to set the characterizing parameter.

3. The energy supply device according to claim 1, wherein the evaluation unit is designed to check the detected operating variable of the energy supply device as to whether it exceeds or falls short of a threshold value in order to characterize the detected operating variable of the energy supply device as a function of the characterizing parameter.

4. The energy supply device according to claim 1, wherein the characterizing parameter encompasses at least one of the following parameters: an amplitude threshold of an input voltage, an amplitude threshold of an input current, an amplitude threshold of an output voltage, an amplitude threshold of an output current, a frequency threshold of a frequency, a power threshold of an input power, a power threshold of an output power, a temperature threshold of a temperature, a time threshold of an operating period, a ripple threshold of an output voltage or a ripple threshold of an output current.

5. The energy supply device according to claim 1, wherein the operating variable of the energy supply device is one of the following operating variables: an input voltage, an input current, an output voltage, an output current, a frequency, an input power, an output power, a temperature, an operating period, an output voltage ripple or an output current ripple.

6. The energy supply device according to claim 1, wherein the evaluation unit is designed to detect a further operating variable of the energy supply device and characterize the detected operating variable of the energy supply device as well as the further detected operating variable of the energy supply device as a function of the characterizing parameter in order to obtain the signaling information.

7. The energy supply device according to claim 6, wherein the evaluation unit is designed to link the detected operating variable of the energy supply device and the further detected operating variable of the energy supply device by a logical operation in order to obtain the signaling information.

8. The energy supply device according to claim 1, wherein the communication interface is designed to output a digital signal to the communications device in order to display the operating state of the energy supply device.

9. The energy supply device according to claim 1, wherein the communication interface is designed to receive the characterizing parameter from the communications device via a communications network.

10. A method for determining signaling information which indicates an operating state of an energy supply device, comprising:
detecting an operating variable of the energy supply device;
setting a characterizing parameter;
characterizing the detected operating variable as a function of the characterizing parameter so as to obtain the signaling information; and
outputting the signaling information to a communication device via a communication interface of the energy supply device,
wherein the communication interface is configured to be wirelessly supplied with electrical energy such that a characterizing parameter of the energy supply device may be set while the energy supply device is in a deactivated state and comprises a near field communication interface,
the communication interface including an antenna which is arranged within a housing of the energy supply device and integrated into a housing wall of a housing of the energy supply device, and
the communication device comprises a computer, smartphone or hand-held device.

11. The method according to claim 10, comprising:
detecting a further operating variable of the energy supply device; and
characterizing the detected operating variable of the energy supply device as well as the further detected operating variable of the energy supply device as a function of the characterizing parameter in order to obtain the signaling information.

12. The method according to claim 10, comprising:
receiving the characterizing parameter from the communications device via a communications network.

13. An energy supply device, comprising:
an evaluation unit for determining signaling information which indicates an operating state of the energy supply device; and
a communication interface for outputting the signaling information to a communication device, wherein the evaluation unit is designed to:
detect an operating variable of the energy supply device;

set a characterizing parameter;

wherein the detected operating variable of the energy supply device as a function of the characterizing parameter in order to obtain the signaling information, the communication interface is configured to be wirelessly supplied with electrical energy such that a characterizing parameter of the energy supply device may be set while the power supply device is in a deactivated state and comprises a near field communication interface, the communication interface including an antenna which is arranged within a housing of the energy supply device or integrated into a housing wall of a housing of the energy supply device, and the communication device comprises a computer, smartphone or hand-held device.

* * * * *